(12) United States Patent
Crosta et al.

(10) Patent No.: US 8,367,980 B2
(45) Date of Patent: Feb. 5, 2013

(54) METHOD FOR CONTROLLING THE HUMIDITY LEVEL IN A COOKING OVEN

(75) Inventors: Paolo Crosta, Gavirate (IT); Tamara Distaso, Gemonio (IT)

(73) Assignee: Whirlpool Corporation, Benton Harbor, MI (US)

( * ) Notice: Subject to any disclaimer, the term of this patent is extended or adjusted under 35 U.S.C. 154(b) by 967 days.

(21) Appl. No.: 12/276,450

(22) Filed: Nov. 24, 2008

(65) Prior Publication Data
US 2009/0134141 A1 May 28, 2009

(30) Foreign Application Priority Data
Nov. 28, 2007 (EP) .................................... 07121780

(51) Int. Cl.
F24C 15/32 (2006.01)
A21B 1/24 (2006.01)
A21B 3/04 (2006.01)
(52) U.S. Cl. ........................... 219/401; 219/497; 99/468
(58) Field of Classification Search .................. None
See application file for complete search history.

(56) References Cited

U.S. PATENT DOCUMENTS

| 5,545,876 | A | * | 8/1996 | Park ............................. 219/492 |
| 5,990,460 | A |   | 11/1999 | Petty et al. |
| 6,118,105 | A | * | 9/2000 | Berkcan et al. ............... 219/497 |
| 6,133,558 | A |   | 10/2000 | Ueda et al. |
| 6,469,282 | B1 | * | 10/2002 | Roberts ......................... 219/481 |
| 7,002,111 | B2 | * | 2/2006 | Bauer ............................ 219/480 |
| 7,081,601 | B2 |   | 7/2006 | Boyer et al. |
| 7,669,591 | B2 | * | 3/2010 | Fossati et al. ................. 126/348 |
| 2002/0063122 | A1 | * | 5/2002 | Katzman et al. ............. 219/497 |
| 2002/0130123 | A1 | * | 9/2002 | Prager .......................... 219/506 |
| 2004/0232140 | A1 |   | 11/2004 | Kanzaki et al. |
| 2006/0251784 | A1 |   | 11/2006 | Sells et al. |
| 2006/0251785 | A1 |   | 11/2006 | Fraccon et al. |
| 2006/0289438 | A1 |   | 12/2006 | Fraccon et al. |

FOREIGN PATENT DOCUMENTS

| JP | 2005-351518 A | * | 12/2005 |
| WO | 9953252 A2 | | 10/1999 |

OTHER PUBLICATIONS

JP 2005-351518 A, Partial translation.*
European Search Report, Application No. EP 07 12 1780, Date Oct. 6, 2008, Whirlpool Europe S.r. l., Viale G. Borghi 27, 21025 Comerio (VA), Italie.

* cited by examiner

Primary Examiner — Joseph M Pelham
(74) Attorney, Agent, or Firm — Jason S. Burnette

(57) ABSTRACT

A method for controlling the humidity level in a cavity of a cooking oven provided with a steam generator comprises the monitoring of the power delivered to the steam generator in order to maintain the power to a predetermined value that is correlated to a choice made by the user among a plurality of predetermined values corresponding to different values of at least one cooking parameter, particularly the degree of browning of the food.

17 Claims, 2 Drawing Sheets

METHOD FOR CONTROLLING THE HUMIDITY LEVEL IN A COOKING OVEN

BACKGROUND

1. Technical Field

The present disclosure relates to a method for controlling the humidity level in a cavity of a cooking oven provided with a steam generator.

Typically a domestic cooking oven comprises electrical heating elements which are controlled using a temperature sensor inside the cavity, said sensor closing the loop on a desired cavity temperature and generating, through a control unit, the proper heating element actuation to maintain the desired set temperature.

In a similar way, the steam generator could be included in the same control loop since it contributes as an additional heating element, to control the cavity temperature. Since the steam temperature at atmosphere pressure is around 100° C., this way of controlling the steam generator is valid when the cavity temperature is below 100° C. (pure steam). When working with superheated steam (with cavity temperature above 100° C.), the way of controlling the steam generator is the cavity humidity control. In other words, typically, the steam generator should be actuated in order to provide the right quantity of steam inside the cavity and maintain the desired humidity level inside the cavity itself. The right humidity level inside the cavity is typically dependent on the food category to be cooked. Other parameters that typically drive the humidity level to be maintained inside the cavity are also: recipes, quantity/mass of food, food types, final result of cooking etc.

The control of the humidity level inside the oven cavity requires generally that the steam is generated and controlled in predetermined period/s during the cooking process (and this is disclosed for example by US-A-20060289438, US-A-20060251785 and US-A-20060251784).

The control of the right humidity level inside the cavity of the oven could be achieved by using a humidity sensor located inside the cavity or in contact with air of the cavity through some pipe or chimney. Using this kind of sensor it is possible to close the loop around humidity level actuating the steam generator according to the output of the control unit. In this way, it could be possible to provide the right humidity level inside the cavity. Once the humidity control is in place, it's still necessary to establish the right humidity level, food category by food category or food by food, considering also food weight and cooking performance desired (browning level, juiciness, etc). Some automatic cooking cycles, like the ones described by the above patent applications, could help in this second aspect of the overall picture. Of course, the professional user could manually establish the right humidity level inside the cavity, modifying the humidity set point that the electronic control could provide via a user interface.

The humidity level inside the cavity can be controlled also in a more simply way: the steam generator is actuated in an open loop control system with a different duty cycle depending on the humidity desired. This principle is based on the fact that the humidity level inside the oven cavity is an algebraic sum of the steam injected by the steam generator and the steam sucked or lost by oven chimney or other cavity openings. This second method is clearly simpler than the first presented and of course also cheaper, more robust and easier to be implemented. The drawback of this method is the precision that can be reached: in fact, this second method is affected by the imprecision of all the open-loop control.

Moreover, one of the more important noises disturbing the open loop algorithm is the variation of the voltage value applied to the steam generator. Some documents have already disclosed methods for solving this additional problem, like WO-A-9953252, U.S. Pat. No. 5,990,460 and U.S. Pat. No. 7,081,601. These patent documents disclose the importance of knowing the voltage value when an open-loop algorithm is used in a cooking process, applying a correction of the duty cycle of the heating elements to compensate the voltage variation effect on the power delivered.

In using the above second methodology (open loop control system) to control the humidity level, there is still the need to improve the performance in order to reach control performances similar to a closed loop control system, but without the complexity/cost to install a humidity sensor inside an oven cavity.

SUMMARY OF THE DISCLOSURE

An aspect of the present disclosure is to provide a method which does not present the above problems and that can be easily used in domestic ovens with a steam generator without a significant increase of the overall cost of the appliance.

Such aspect is reached according to a method as specified in the appended claims.

According to the present disclosure, the humidity level inside the oven cavity can be automatically controlled by the oven according to the food type, food properties and cooking preferences selected by the user. Moreover the present disclosure provides a method according to which the complicate setting of the humidity level inside the cavity, operation that requires specific knowledge to obtain satisfactory results, is entirely delegated to the appliance.

Another feature of the method according to the disclosure is that the algorithm of the control system allows at the same time a compensation of the voltage variation effect, and a method for the automatic humidity control. The measurement of the voltage value (or power as better specified later) is just one of the information required from the algorithm to estimate and control the humidity level.

The main disturbance factors that contribute to the imprecision of the open-loop methodology are the variation of the steam generation rate and the variation of the steam extracted from the cavity.

The steam generation rate (once the water has reached boiling temperature) is strictly linked to the power of the heating element inside the boiler (or steam generator) by the specific latent heat of evaporation (k):

$$\text{STEAM}(g/s) = k * \text{Power}(W) * \alpha$$

Where the constant $\alpha$ represents the efficiency of the steam generator, that could be obtained from experimental data.

From the equation 1, it's clear that the power variation is responsible for the steam generation rate. Again, the power generated by a heating element depends on the value of the resistance and on the voltage value applied, according the well-known Ohm law.

The measurement of the power drawn by the steamer-heating element gives the possibility to know exactly, through the above equation, the rate of the steam generated, independently from the voltage fluctuation and the tolerances of the heating element itself.

The efficiency $\alpha$ of the steamer generator depends on the thermal insulation of the steamer itself, but it also depends on the calcareous deposition that typically affects the heating element immersed into water. The presence of a temperature sensor inside the boiler (or steam generator), located very close to the heating element with its sensible part, could help to evaluate the presence and quantity of scale inside the boiler. In fact, the scale deposition will be both on the heating element and on the temperature sensor creating an insulator layer that could be measured with an increment of temperature read by the temperature sensor itself. Correlating this temperature increment with the scale deposition and the efficiency α of the boiler itself, it will be possible to generate an experimental law that links the temperature read by the sensor with the efficiency α itself.

Knowing exactly the steam generation rate, in order to further improve the precision of the control method it is necessary to know the efficiency of the gas extractor system of the oven cavity. Typically, the extraction of vapour from cavity is carried out by means of a chimney that connects the cavity itself with the external ambient. The extraction from the chimney can be driven by natural pressure difference between cavity and external ambient but, more frequently, the extraction is driven by a venturi or directly by a fan sucking the air from the cavity to the outside.

This means that the efficiency of the extraction system depends on the rotation speed of the above-mentioned fan, or depends on the speed of the air in the venturi system.

By applying Bernoulli equation, the delta pressure created by venturi is proportional to the square of the fluid speed:

$$\Delta P \cong v_{fluid}^2$$

For the most of the oven applications, the fan motor rotation speed depends on the supply voltage value with some law. It is possible to describe the relation between voltage value and fan air velocity with a linear equation like:

$$v_{fluid} = \alpha + \beta \times \text{Voltage}$$

In synthesis, the equation that could be used to evaluate the humidity level into the cavity (in steady state, that is after filling the cavity with steam and having reached the equilibrium state) is:

$$\text{HumidityLevel} = (k_1 \times \text{Power}) - (k_3 + k_4 \times \text{Voltage}^2)$$

where k1, k3 and k4 are suitable constant values that could be experimentally obtained (by an identification process).

Once the method to control the humidity inside the cavity is in place, there could be the need to generate the right set point for humidity level according to the food type, food weight, and performance results. Having estimated the food weight and knowing the food category from the user interface, it is possible to link the optimal humidity level inside the cavity to the weight itself. For example, some product categories like meat get the best cooking performances if the steam injection time is proportional to the food weight.

Another opportunity that can generate benefit on cooking performance is to link the humidity level inside the cavity to the total cooking time set by the user, knowing also the food category.

Finally, the humidity profile during the cooking process can be linked to the desired cooking performance (for example juiciness or browning) set by the user, knowing also the food category.

In other words, the combination of cooking temperature and steam injection (time, rate and humidity control) is able to guarantee, for the same cooking degree (level of doneness), different results in terms of browning/cooking times. This means that by controlling the cooking algorithms it's possible to give to the consumer the total control on the final cooking result, giving the user a broader range of possibilities.

BRIEF DESCRIPTION OF THE DRAWINGS

The following examples will clarify the above advantage, with reference to the attached drawings in which.

DETAILED DESCRIPTION OF THE PREFERRED EMBODIMENTS

With reference to the drawings, a piece of meat (eye of round beef) of 1 kg (2.3 lb) was cooked in an oven prototype based on KitchenAid dual fuel steam assisted range model KDRP707RSS provided with a control system according to the disclosure.

Figure 1:
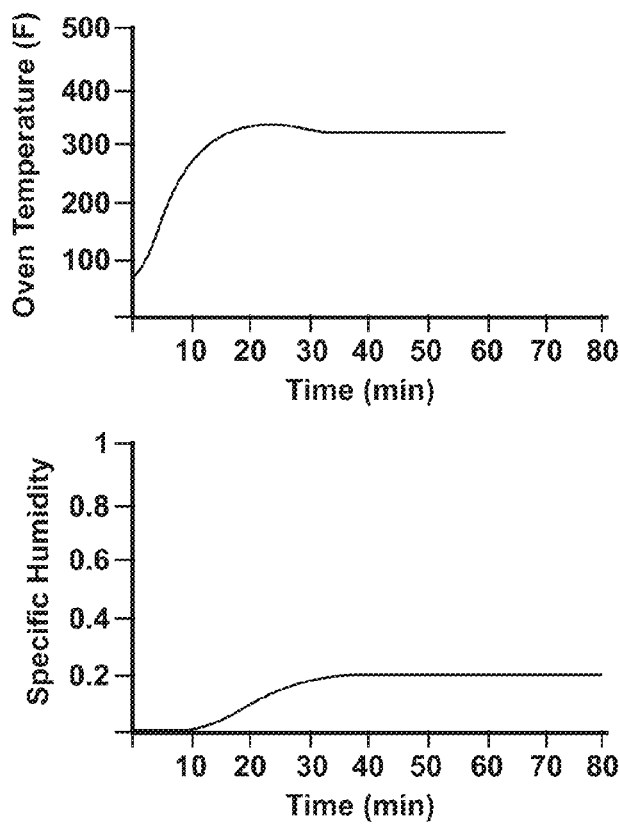
FIG. 1 is a couple of diagrams showing the oven temperature and the humidity level vs. time of a first meat cooking process according to the disclosure.
Figure 2:
FIG. 2 is a photo showing the meat after the cooking process of FIG. 1.

In both the above examples the final cooking temperature was 163° C. (325° F.) with pastry function. In the first example (FIGS. 1-2), the setting of a degree of browning of "4" was translated by the cooking algorithm in a predetermined power (i.e. voltage) to the steam generator in order to provide a predetermined humidity profile inside the cavity (in the specific example a specific humidity of 0.2). As a consequence, the cooking rate has been automatically set by the control at 48 min/kg (22 min/lb). In FIG. 1 it is clear that at a predetermined power delivered to the steam generator, there is a corresponding humidity profile.

With the above term "degree of browning" we mean an empirical score from 1 to 5 corresponding to the following situations:

| Browning score | Appearance |
| --- | --- |
| 1 | Not browned |
| 2 | Slightly browned |
| 3 | Browned, but less than 50% seared |
| 4 | 50%-89% seared/dark brown |
| 5 | 90%-100% seared/dark brown |

With the term "specific humidity" we mean the ratio between the mass of vapour and the total mass of vapour and dry air:

$$\text{SpecificHumidity} = \frac{m_v}{m_v + m_a}$$

Figure 3:
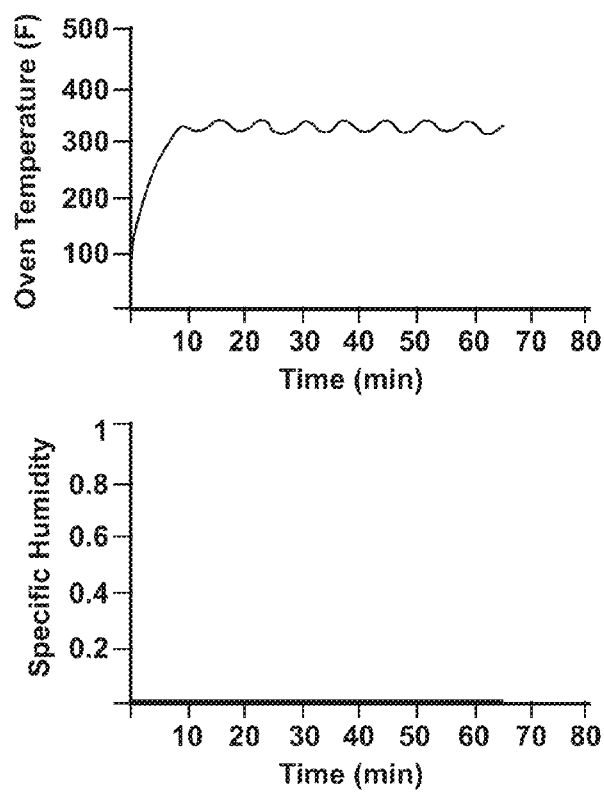
FIG. 3 is a couple of diagrams similar to FIG. 1 and related to a second cooking process, in which the humidity profile is different.

In the example of FIG. 3 a browning degree of "2" was selected. The control unit translated this input by means of the algorithm in a predetermined power (voltage) to the steam generator in order to provide a predetermined humidity profile inside the cavity. As a consequence the cooking rate has been automatically set by the control at 66 min/kg (30 min/lb).

Figure 4:
FIG. 4 is a photo showing the meat after the cooking process of FIG. 3.

In both examples the meat was cooked until the core temperature achieved 54° C. (130° F.). From a comparison of FIGS. 2 and 4 it is clear how a precise and not expensive control of the humidity level allowed a different cooking result based on the cooking function chosen by the user.

We claim:

1. A method for controlling a humidity level in a cavity of a cooking oven provided with a steam generator, wherein power delivered to the steam generator is monitored in order to maintain the power to a predetermined value and a flow rate of air extracted from the cavity is also monitored.

2. The method according to claim 1, wherein a value of the power delivered to the steam generator is linked to a choice made by the user among a plurality of predetermined values corresponding to different values of at least one cooking parameter.

3. The method according to claim 2, wherein the cooking parameter is selected from the group consisting of food type, food weight, cooking performances, cooking time or combination thereof.

4. The method according to claim 1, wherein the power drawn by the steam generator is obtained from Ohm's law and by measuring voltage or current absorbed by a heating element of the steam generator and knowing a value of a resistance of the heating element.

5. The method according to claim 1, wherein a humidity profile inside the cavity is automatically established by a control for the oven according to a food category selected by a user, or according to a weight of food estimated by the control or inputted by the user, or according cooking preferences selected by the user.

6. The method according to claim 1, wherein a humidity profile inside the cavity is automatically established by a control for the oven according to a total cooking time estimated by the control or inputted by a user.

7. The method according, to claim 1, wherein a humidity level inside the cavity is modulated during a cooking process according to a food category selected by a user or according to a weight of food estimated by a control for the oven or inputted by the user or according the to cooking preferences selected by the user, or according to total cooking time estimated by the control or inputted by the user.

8. The method according to claim 1, in which the cavity is provided with a fan for extracting the air, wherein the humidity level is controlled according to the following formula:

HumidityLevel=$(k_1 \times \text{Power}) - (k_3 + k_4 \times \text{Voltage}^2)$ wherein "Power" is a controlled power delivered to the steam generator, "Voltage" is the voltage of the current delivered to a motor of the fan, and k1, k3 and k4 are experimental values.

9. A method for controlling a humidity level in a cavity of a cooking oven provided with a steam generator, wherein power delivered to the steam generator is monitored in order to maintain the power to a predetermined value, wherein an efficiency value of the steam generator is evaluated by means of a temperature sensor inside the steam generator, such temperature being affected by scale deposition and measuring a temperature drift due to an insulation layer created by scale, the efficiency value being used to evaluate a rate of steam generated by the steam generator.

10. The method according to claim 9, wherein a flow rate of air extracted from the cavity is monitored as well.

11. The method according to claim 10, in which the cavity is provided with a fan for the extracting the air, wherein the humidity level is controlled according to the following formula:

HumidityLevel=$(k_1 \times \text{Power}) - (k_3 + k_4 \times \text{Voltage}^2)$ wherein "Power" is a controlled power delivered to the steam generator, "Voltage" is the voltage of the current delivered to a motor of the fan, and k1, k3 and k4 are experimental values.

12. The method according to claim 9, wherein a value of the power delivered to the steam generator is linked to a choice made by the user among a plurality of predetermined values corresponding to different values of at least one cooking parameter.

13. The method according to claim 12, wherein the cooking parameter is selected from the group consisting of food type, food weight, cooking performances, cooking time or combination thereof.

14. The method according to claim 9, wherein the power drawn by the steam generator is obtained from Ohm's law and by measuring voltage or current absorbed by a heating element of the steam generator and knowing a value of a resistance of the heating element.

15. The method according to claim 9, wherein a humidity profile inside the cavity is automatically established by a control for the oven according to a food category selected by a user, or according to a weight of food estimated by the control or inputted by the user, or according cooking preferences selected by the user.

16. The method according to claim 9, wherein a humidity profile inside the cavity is automatically established by a control for the oven according to a total cooking time estimated by the control or inputted by a user.

17. The method according to claim 9, wherein a humidity level inside the cavity is modulated during a cooking process according to a food category selected by a user or according to a weight of food estimated by a control for the oven or inputted by the user or according to cooking preferences selected by the user, or according to total cooking time estimated by the control or inputted by the user.

* * * * *